United States Patent
Bellegarda et al.

(10) Patent No.: US 8,989,492 B2
(45) Date of Patent: Mar. 24, 2015

(54) MULTI-RESOLUTION SPATIAL FEATURE EXTRACTION FOR AUTOMATIC HANDWRITING RECOGNITION

(75) Inventors: Jerome R. Bellegarda, Saratoga, CA (US); Jannes G. A. Dolfing, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 13/507,118

(22) Filed: Jun. 4, 2012

(65) Prior Publication Data

US 2012/0308138 A1 Dec. 6, 2012

Related U.S. Application Data

(60) Provisional application No. 61/493,339, filed on Jun. 3, 2011.

(51) Int. Cl.
*G06K 9/00* (2006.01)

(52) U.S. Cl.
CPC .............. *G06K 9/00429* (2013.01); *G06K 9/00* (2013.01); *G06K 9/00416* (2013.01)
USPC ........... 382/181; 382/115; 382/157; 382/185; 382/187; 382/509; 382/511; 382/202; 382/200

(58) Field of Classification Search
USPC ......... 382/115, 157, 181, 185, 187, 289, 296; 345/509, 511, 202, 200
See application file for complete search history.

(56) References Cited

U.S. PATENT DOCUMENTS

| | | | | | |
|---|---|---|---|---|---|
| 4,829,583 | A | * | 5/1989 | Monroe et al. | 382/185 |
| 5,293,254 | A | * | 3/1994 | Eschbach | 358/445 |
| 5,500,905 | A | * | 3/1996 | Martin et al. | 382/157 |
| 5,742,705 | A | * | 4/1998 | Parthasarathy | 382/185 |
| 5,757,979 | A | * | 5/1998 | Hongo et al. | 382/276 |
| 5,812,697 | A | * | 9/1998 | Sakai et al. | 382/186 |
| 5,812,698 | A | * | 9/1998 | Platt et al. | 382/186 |
| 5,991,441 | A | * | 11/1999 | Jourjine | 382/187 |
| 6,259,826 | B1 | * | 7/2001 | Pollard et al. | 382/284 |
| 6,628,808 | B1 | * | 9/2003 | Bach et al. | 382/115 |
| 6,839,464 | B2 | * | 1/2005 | Hawkins et al. | 382/187 |
| 7,580,551 | B1 | * | 8/2009 | Srihari et al. | 382/115 |
| 8,050,500 | B1 | * | 11/2011 | Batty et al. | 382/187 |
| 8,760,537 | B2 | * | 6/2014 | Johnson et al. | 348/229.1 |
| 2002/0031262 | A1 | * | 3/2002 | Imagawa et al. | 382/190 |
| 2002/0135565 | A1 | * | 9/2002 | Gordon et al. | 345/169 |
| 2003/0190074 | A1 | * | 10/2003 | Loudon et al. | 382/187 |
| 2004/0096105 | A1 | * | 5/2004 | Holtsberg | 382/186 |
| 2005/0100214 | A1 | * | 5/2005 | Zhang et al. | 382/179 |

(Continued)

*Primary Examiner* — Vu Le
*Assistant Examiner* — Aklilu Woldemariam
(74) *Attorney, Agent, or Firm* — Morrison & Foerster LLP

(57) ABSTRACT

A first technique of recognizing content is disclosed, including: determining a first value representative of a pixel content present at a first set of pixels associated with a first distance from a pixel under consideration; determining a second value representative of a pixel content present at a second set of pixels associated with a second distance from the pixel under consideration; and using the first and second values to compute one or more spatial features associated with the pixel under consideration for purposes of content recognition. A second technique of recognizing content is also disclosed, including: determining, for a pixel, a first value representative of a first feature associated with a set of pixels associated with a first direction from the pixel; and determining, for the pixel, a second value representative of a second feature associated with a set of pixels associated with a second direction from the pixel.

27 Claims, 12 Drawing Sheets

(56) References Cited

U.S. PATENT DOCUMENTS

2005/0152602 A1* 7/2005 Chen et al. .................... 382/187
2008/0056579 A1* 3/2008 Guha ............................ 382/187
2008/0131006 A1* 6/2008 Oliver .......................... 382/229
2008/0240569 A1* 10/2008 Tonouchi ..................... 382/186
2009/0123071 A1* 5/2009 Iwasaki ........................ 382/176

* cited by examiner

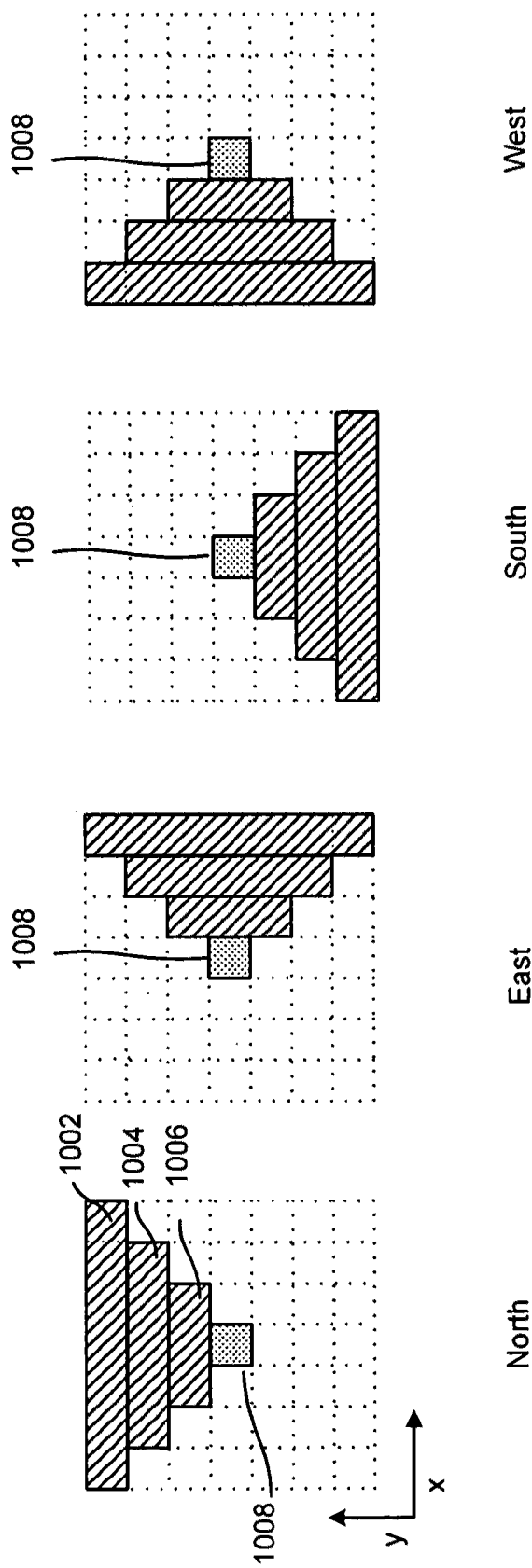

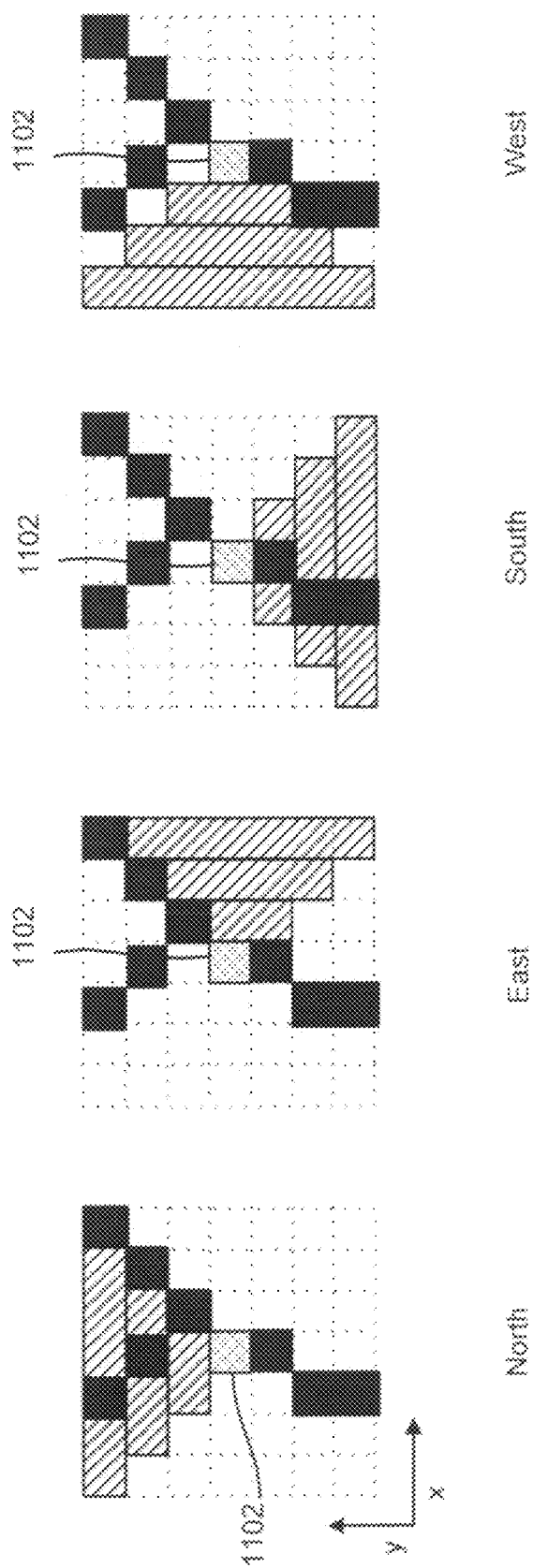

though the invention is described in conjunction with such embodiments, but the…

MULTI-RESOLUTION SPATIAL FEATURE EXTRACTION FOR AUTOMATIC HANDWRITING RECOGNITION

CROSS REFERENCE TO OTHER APPLICATIONS

This application claims priority to U.S. Provisional Patent Application No. 61/493,339 entitled MULTI-RESOLUTION SPATIAL FEATURE EXTRACTION FOR AUTOMATIC HANDWRITING RECOGNITION filed Jun. 3, 2011 which is incorporated herein by reference for all purposes.

BACKGROUND OF THE INVENTION

In handwriting recognition, information gathered on characters handwritten onto a motion tracking surface or otherwise entered by hand can include spatial information. Spatial information can characterize the overall shape of a character input and/or a portion of the character input. Conventionally, the spatial information of a character input is extracted from a bitmap of the input.

One difficulty in performing handwriting recognition is that the production of handwritten characters is subject to a range of artifacts reflecting the variability of human behavior. For example, an input stroke that is intended to be horizontal is, in fact, very unlikely to be perfectly horizontal. Instead, the stroke may display a slight slant, either due to the particular angle of the writing device or the angle of the user's finger. The input stroke may comprise short "hooks" in random directions at the beginning and/or at the end of the stroke. Depending on how the finger or other writing accessory (e.g., stylus) landed on and left the writing surface, it may show little wiggles in places, caused by uneven motor control and it may even be briefly interrupted if the finger or other writing accessory briefly lost contact with the writing surface.

To smooth out such artifacts, conventionally, the resolution of the device receiving the handwritten characters is lowered, for example, by utilizing a coarser bitmap. For example, for a device with a native 960-by-640-pixel resolution, the 32-by-32 bitmap may be chosen (e.g., by a designer of the handwriting recognition technique). However, one drawback to selecting a coarser bitmap is that while the lower resolution helps to ignore some of the artifacts, it may also obscure important details of the input character, which could be critical to disambiguate between certain words or characters. This is especially relevant when it comes to the recognition of Chinese characters because of the inherent complexity of characters with many strokes (e.g., more than 20 strokes is not all that uncommon, particularly with named entities), and the fact that sometimes only one short stroke is the key to disambiguating between two Chinese characters.

In order to perform handwriting recognition using feature extraction, features related to the spatial aspects of a character are extracted from the input. Typically, spatial features tend to include variations on pixel-level chain (or stroke) codes, sector occupancy, and the Rutovitz crossing number. Though the exact size of the bitmap may vary, it is typically chosen a priori and subsequently used throughout the feature extraction. As a result, spatial features are obtained at a single, fixed resolution determined by the size of the bitmap.

BRIEF DESCRIPTION OF THE DRAWINGS

Various embodiments of the invention are disclosed in the following detailed description and the accompanying drawings.

FIGS. 10A, 10B, 10C, and 10D illustrate examples of spatial features to be extracted from four cardinal directions of a pixel under consideration.

FIGS. 11A, 11B, 11C, and 11D illustrate examples of spatial features to be extracted from four cardinal directions of a pixel under consideration.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Extraction of spatial features at multiple resolutions is disclosed. In some embodiments, for a pixel, a value representative of pixel content present at a set of pixels associated with each of at least two distances from the pixel is determined. In some embodiments, for a pixel, a value representative of a feature associated with a set of pixels associated with a plurality of distances in at least one direction from the pixel is determined. In some embodiments, determining a value representative of a feature associated with a set of pixels associated with a plurality of distances in one direction from the pixel includes determining values representative of pixel contents present at sets of pixels associated with at least two distances from the pixel.

Figure 1:
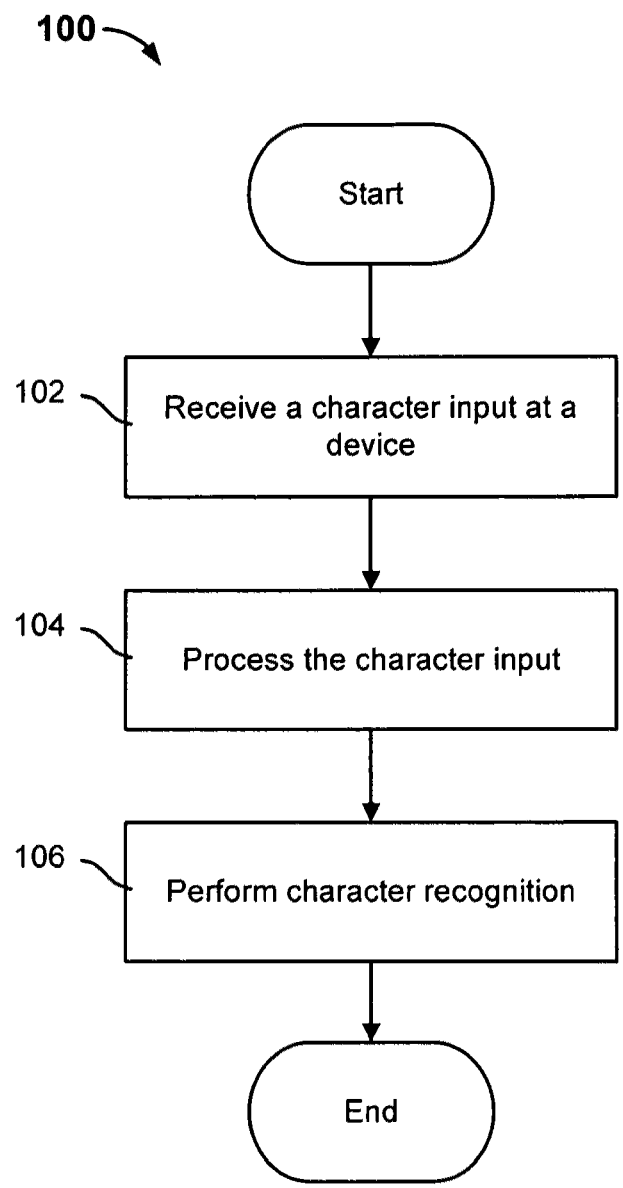
FIG. 1 is a flow diagram showing an embodiment of a process of handwriting recognition.

FIG. 1 is a flow diagram showing an embodiment of a process of handwriting recognition. In some embodiments, process 100 is used to map handwritten characters into encodings of text (e.g., Unicode, Big5, GB18030, JIS X 0213, and/or ASCII).

In some embodiments, handwriting recognition can be applied to each handwritten stroke (e.g., a character such as a Chinese character can have multiple stokes). In some embodiments, all strokes are completed for a particular character input (e.g., a Chinese character) and then handwriting recognition is applied to the completed character. In some embodiments, multiple characters are written and then each character is analyzed in isolation, or with the context of previously recognized characters. The example of process 100 is discussed below with respect to analyzing a completed character input in isolation, although process 100 can be extended and applied to other types of handwriting recognition (e.g., analyzing multiple character inputs together, analyzing each stroke of a character individually). Examples of a character input can include a handwritten production of a Latin character (e.g., "a," "b," "c") or a Chinese character (e.g., "人").

At 102, a character input is received at a device. In some embodiments, the device is configured to include an input area at which a handwritten character can be input and received. Examples of such a device include a laptop computer, desktop computer, tablet device (e.g., Apple's iPad and iPad 2), mobile phone (e.g., Apple's iPhone), and other types of mobile devices. Examples of such an input area include a trackpad (e.g., Apple's Magic Trackpad, or the built-in trackpad of a MacBook pro), an electronic writing surface, a touchpad, and a touch screen (e.g., of a tablet and/or mobile phone device). The input area can be integrated into the device and/or can be a separate accessory that is connected (e.g., via a wire or wireless link) to the device, for example. In various embodiments, the input area is a specialized surface that can receive and capture the motion and position (e.g., and sometimes, pressure and/or tilt angles and/or surface area) of a writing accessory (e.g., a human finger or stylus) into a sequence of sample points (e.g., using periodic sampling of tracings made by the writing accessory on the input area). In some embodiments, the sequence of sample points include and/or are associated with both temporal (e.g., velocity, acceleration, sequence number) and spatial (e.g., a (x, y) coordinate) values. In some embodiments, the sequence of sample points is used by the device to represent the input character. In some embodiments, a visual representation of the character input is displayed (e.g., at the input area and/or an associated computer monitor) as it is still in production and/or subsequent to its completion.

At 104, the character input is processed. In various embodiments, at least a process of feature extraction is applied at 104. Generally, the purpose of feature extraction is to map input information to a reduced set of information (i.e., features, which can be represented by mathematical vectors) such that the input information can be accurately recognized or classified based on the reduced representation of features. A feature is a variable that is used to represent a characteristic of the input information. Features are selected and defined by designers of a feature extraction process to help decode/classify the input information, distinguish and/or disambiguate the input information, and/or accurately map the input information to the output values. As applied to the present application, the input information for a feature extraction process includes a character input (e.g., as represented by a sequence of sample points) and the output values include text encoding. The technique of determining the value(s) for the defined feature(s) is referred to as feature extraction. The values of the extracted features are placed into one or more vectors, on which decoding (e.g., pattern/handwriting recognition) is performed.

In various embodiments, two categories of input information from which features are extracted include temporal information and spatial information. In some embodiments, temporal information preserves the sequential order (e.g., and associated timestamps) in which sample points are captured at the input area. In some embodiments, spatial information represents the overall shape of the underlying character input, regardless of how it was produced. In some embodiments, temporal feature extraction aims to take advantage of the sequential order in which points are captured by the electronic surface, so as to derive information related to the dynamic aspects of the handwriting production. Examples of temporal features include the position, velocity, and acceleration at each sample point. In some embodiments, spatial extraction aims at representing the overall shape of the character input. Examples of spatial features include variations on chain (or stroke) code, sector occupancy, and pixel-level Rutovitz crossing number. As further described below, extraction of spatial features at multi-resolutions is disclosed. In some embodiments, both temporal and spatial features are included in the same set of feature vectors that are analyzed by a set of character recognition models.

In some embodiments, prior and/or subsequent to feature extraction, one or more of filtering and normalizing can be applied to the character input.

At 106, character recognition is performed on the character input. In various embodiments, the features extracted at 104 (e.g., in the form of feature vectors) are fed into one or more character recognition/decoder/classification models. In some embodiments, a set of character recognition models includes one or both of a character/component model and a language model. In some embodiments, the set of character recognition models include one or more of the following: a statistical model (e.g., a Hidden Markov Model), a neural network, a support vector machine, and a form of machine learning. In various embodiments, regardless of the specific character recognition models that are used, the set of models has been tailored to the specific features selected/defined for the preceding feature extraction process. Also, the set of models has been trained with sample inputs to produce the desired outputs (e.g., outputs that have the highest probability of matching or correlating with the given input(s)). In various embodiments, the character recognition model is implemented using a combination of software and hardware across one or more devices.

For example, if the features selected for the feature extraction process included two temporal features of position and velocity and two spatial features of chain strokes and sector occupancy, then the character recognition model to be used is tailored for those four features.

In various embodiments, the output of a character recognition process for a piece of given input information that is a character input is an encoded text character. In some embodiments, the output of a character recognition process for a piece of given information that is more than one character is a word or a sentence. In some embodiments, text encoding schemes include Unicode, ASCII, Big5, HKSCS, GB 18030, JIS X 0213 and or other appropriate encodings. In some embodiments, the output encoded text character is the encoded text character that the character recognition model has determined to have the highest probability to map to and/or have the strongest correlation to the input, handwritten character. In various embodiments, the output of character recognition for a piece of given input information of a input character are more than one encoded text characters, which the character recognition model has determined to have the highest probabilities (over other possible output characters) to map to and/or have the strongest correlations to the input, handwritten character. In some embodiments, the output encoded text characters are displayed (e.g., for a user to select among) and/or submitted to a word processing software application.

Figure 2B:
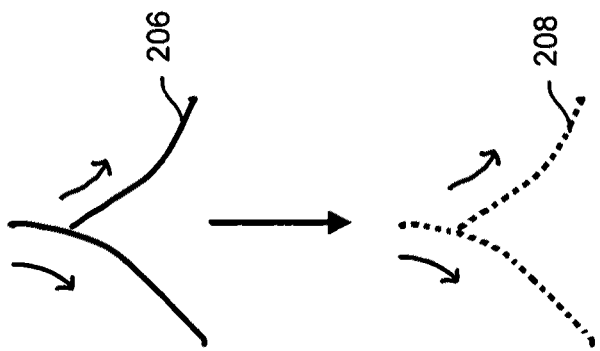
FIG. 2B is an example of a handwritten input of the Chinese character "人" (pronounced "ren" and means "person" or "people" in English).
Figure 2A:
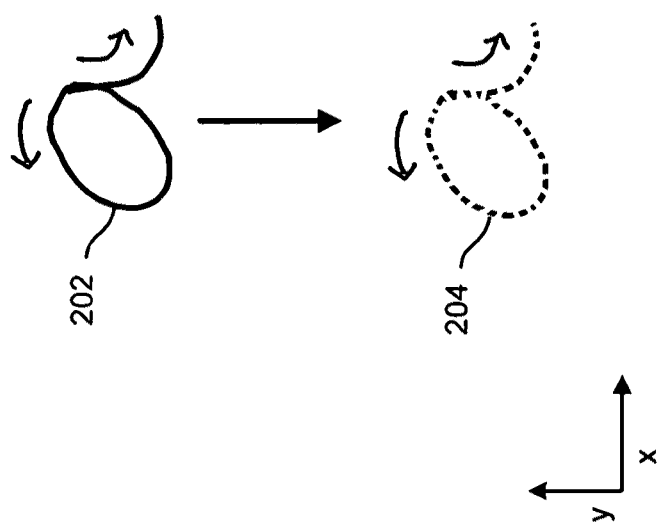
FIG. 2A is an example of a handwritten input of the Latin character "a."

FIGS. 2A and 2B are examples of characters that are input into an input area of a device configured to receive character inputs. In some embodiments, handwritten productions (e.g., 202 and 206) can be received by a device using 102 of process 100.

FIG. 2A is an example of a handwritten input of the Latin character "a." Assume that handwritten production 202 was intended to be the lower case Latin character "a" (i.e., accurate character recognition of handwritten production 202 could map it to the encoded character of "a" in some text encoding scheme). Handwritten production 202 could have been written into an input area of a device by a user of the device. The user could have used his/her finger and/or a writing accessory (e.g., stylus) to produce handwritten production 202 by tracing along the surface of the input area in the outline of handwritten production 202. In this example, handwritten production 202 was created using one continuous stroke, meaning that the user created handwritten production 202 without lifting the finger/writing accessory off the input area. While handwritten production 202 appears as continuous lines, it is received by the device via periodic sampling. In this example, sequence of sample points 204 is the form in which the device is configured to receive handwritten production 202. Each sample point of sequence of sample points 204 can be associated with a two-dimensional coordinate (e.g., x, y coordinate) and/or a time element (e.g., a sequence number and/or timestamp) that indicates its production time relative to the other sample points. In some embodiments, a sample point can also be mapped to at least one filled in pixel on a bitmap. For example, the mapping of one (x, y) sample point can be to N pixels. The mapping of a sample point to a certain number of pixels can depend on the number of sample points in a sequence (e.g., as determined by the size of the handwriting production) and the size of the bitmap to which the sequence is mapped. For example, if a large bitmap (e.g., 10,000 by 10,000) is chosen, then the bitmap would be sparse if one sample point were mapped to only one pixel. In this scenario, lines (of pixels) can be drawn between the mapped to pixels, which would result in one sample point being mapped to more than one pixel. On the other hand, if the grid were small (e.g., 10 by 10), then several sample points could be mapped to one pixel (e.g., as a way of "compressing" the sampled data). In some embodiments, a pixel is associated with a two dimensional (e.g., (x, y)) coordinate associated with the bitmap. While the sample points of sequence of sample points 204 in the example are shown to be relatively evenly spaced apart, there could be clusters of adjacent sample points that appear closer together or farther apart, depending on how quickly a stroke (or a portion thereof) was produced/inputted in the input area.

FIG. 2B is an example of a handwritten input of the Chinese character "人" (pronounced "ren" and means "person" or "people" in English). Assume that handwritten production 206 was intended to be the Chinese character of "人" (i.e., accurate character recognition of handwritten production 206 could map it to the encoded character of "人" in some text encoding scheme). Handwritten production 206 could have been produced in a manner similar to handwritten production 202 (e.g., written to an input area by a writing finger/accessory). However, unlike handwritten production 202, in this example, handwritten production 206 was produced by two strokes; the first stroke originated from the top of the character and veered left on the page and was created before the creation of the second stroke that originated from the top of the character and veered right on the page. Similar to handwritten production 202, handwritten production 206 is also received by the device as a sequence of sample points, such as sequence of sample points 208. Each sample point of sequence of sample points 208 can have similar properties to a sample point of sequence of sample points 204 (e.g., be associated with a (x, y) coordinate and a sequence number).

Figure 3:
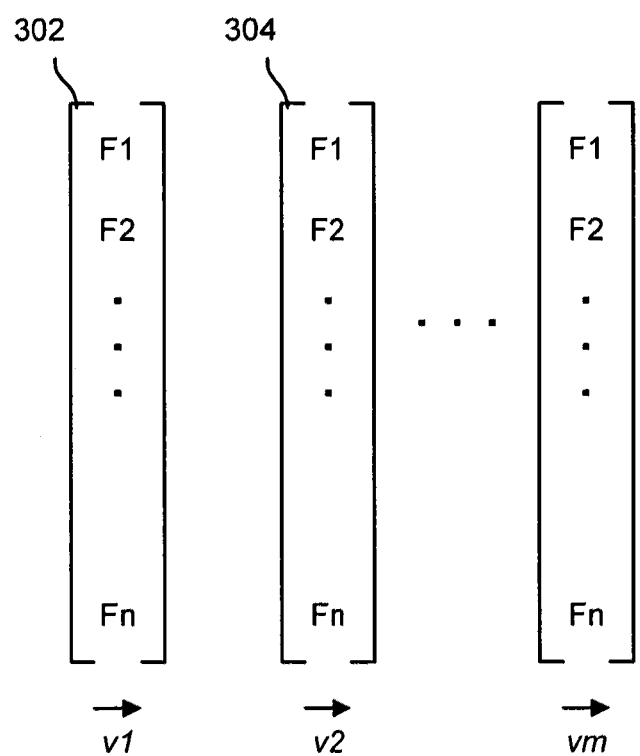
FIG. 3 is a diagram showing an example of feature vectors.

FIG. 3 is a diagram showing an example of feature vectors. In various embodiments, feature extraction (such as the process applied in 104 of process 100) maps various characteristics (i.e., features) of a character input into a set of values. In some embodiments, features are extracted for one or more sample points of a character input and the values corresponding to the extracted features are placed into a feature vector associated with those one or more sample points. In this example, feature vector $v_1$ 302 is associated with one or more sample points of a character input received at an input area of a device. Feature vector 302 includes values corresponding to extracted features $F_1$, $F_2$, through $F_n$ associated with those one or more sample points. Similarly, feature vector $v_2$ 304 is associated with another one or more sample points (and may include at least some of the sample points from which the features of feature vector $v_1$ 302 were extracted) and includes values corresponding to extracted features $F_1$, $F_2$, through $F_n$ associated with those one or more sample points, and so forth. In some embodiments, features extracted to be included in a feature vector include temporal features and/or spatial features and/or a combination/transform of temporal and spatial features. In this example, the set of feature vectors $v_1$, $v_2$, through $v_m$ form a matrix of values (which is of n-by-m dimensions in this example), which, in some embodiments may also be referred to as a feature space. In some embodiments, the feature space may be generated from the sequence of sample points derived from the character input to represent the character input. For example, the feature space that represents a character input may include 100 to 200 feature vectors. The feature space can be fed into a set of character recognition models to determine one or more encoded text characters that correspond to the character input. The set of character recognition models to which the feature space is fed is trained on the specific features included in the feature space. In some embodiments, the feature space can be reduced in at least one dimension through a manual or automatic selection (e.g., using matrix multiplication) of a subset of values of the feature space (e.g., the values selected are presumed to include more helpful information to assist in the recognition process) before it is fed to the set of character recognition models.

Figure 4A:
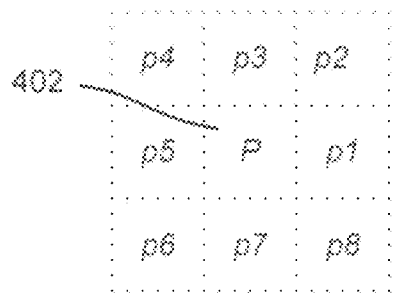
FIG. 4A shows a scheme for calculating a Rutovitz crossing number (RN) for pixel P (which is center pixel 402 as shown in the example).
Figure 4B:
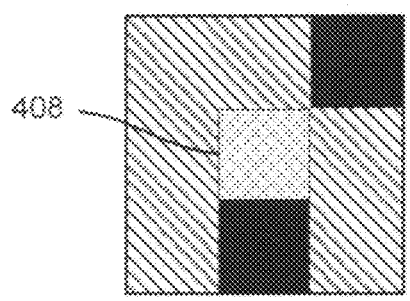
FIG. 4B shows an example of applying a Rutovitz crossing number calculation to a pixel of a character input.

FIGS. 4A and 4B illustrate the conventional spatial feature of a Rutovitz crossing number.

FIG. 4A shows a scheme for calculating a Rutovitz crossing number (RN) for pixel P (which is center pixel 402 as shown in the example). In various embodiments, a pixel refers to a single point in a bitmap, the smallest addressable screen element in a display device or the smallest unit of an image that can be represented or controlled. In some embodiments, each sample point of a character input is mapped to at least one filled in pixel. While a pixel is shown as rectangle (e.g., a square) in the figures, the representation of a pixel is not limited to only a rectangle. The Rutovitz crossing number essentially reflects the number of filled in pixels in the immediate neighborhood (e.g., the eight surrounding pixels) of the pixel under consideration and thereby gives an indication of the type of edge present in this neighborhood. The Rutovitz crossing number for pixel P of FIG. 4 can be determined using the following formula:

$$RN = \frac{1}{2}\sum_{i=1}^{8} |p_i - p_{i+1}| \qquad (1)$$

In formula (1), $p_i$ is 1 when the corresponding pixel is filled in (shown as black in the figures) and $p_i$ is 0 when the corresponding pixel is blank (shown as white in the figures). Each of $p_1$ to $p_8$ represents an immediate neighbor pixel of center pixel 402. Also, by convention, $p_9 = p_1$.

FIG. 4B shows an example of applying a Rutovitz crossing number calculation to a pixel of a character input. In this example, the pixel under consideration, which corresponds to one or more sample points, is center pixel 408. The immediate neighborhood of center pixel 408 is shown to be shaded in and includes two filled in pixels. As such, the Rutovitz crossing number for center pixel 408, as determined by formula (1), is 2.

A drawback of the conventional Rutovitz crossing number spatial feature is that its determination of pixel content (e.g., the number of filled in pixels) relative to a pixel under consideration is limited to the immediate vicinity of that pixel. Due to the variability in human behavior, handwriting production and hence the size of a character input may vary from user to user, regardless of the overall size of the input area. Sometimes, the size of a character input may be relatively large as compared to the overall size of the input area and sometimes the size of a character input may be relatively small as compared to the overall size of the input area. When the size of a character input is relatively large, the Rutovitz crossing number for each sample point provides less information about the overall shape of the underlying character input because, for example, there are more pixels that comprise the character and/or the pixels are spread farther apart in the bitmap to which the character input is mapped. As a result, especially for character inputs that are relatively large as compared to the size of the input area, the Rutovitz crossing number may not always provide the most helpful information regarding each pixel within the context of the entire character input. It would be helpful to consider a range of distances from the pixel under consideration at which to determine pixel content(s), and not only in the immediate neighborhood of the pixel. Determining such a spatial feature at a range of distances from the pixel is discussed below.

Figure 5:
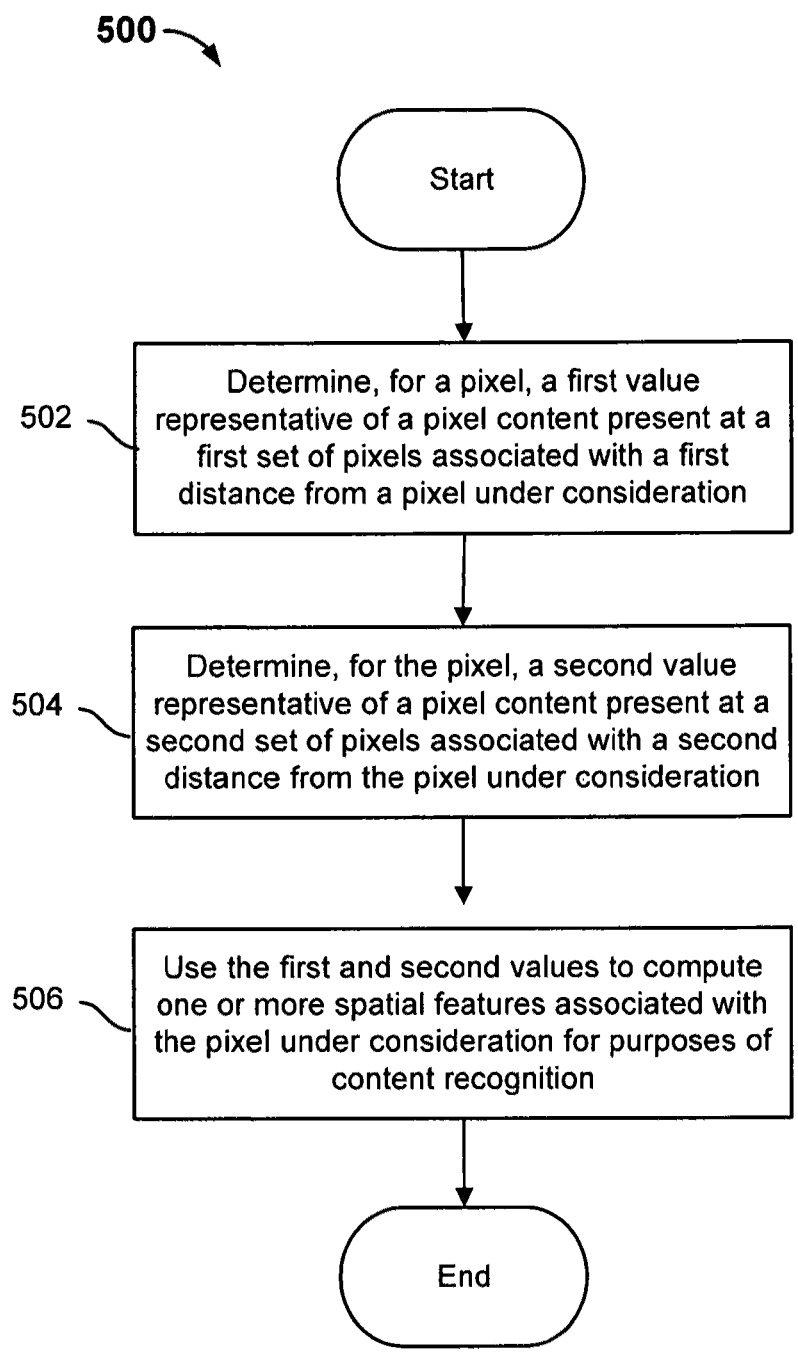
FIG. 5 is a flow diagram showing an embodiment of a process for extracting a multi-resolution spatial feature for a pixel.

FIG. 5 is a flow diagram showing an embodiment of a process for extracting a multi-resolution spatial feature for a pixel. In some embodiments, process 500 is implemented at least as a part of 104 of process 100. In some embodiments, values determined by process 500 are included in a feature vector such as feature vector 302 of FIG. 3.

At 502, for a pixel, a first value representative of a pixel content present at a first set of pixels associated with a first distance from the pixel is determined. In some embodiments, a character input is mapped to a set of filled in pixels at a bitmap. In some embodiments, when the pixel content of a set of pixels other than those in the immediate neighborhood of the pixel under consideration is determined, a modified version of the formula for finding the Rutovitz crossing number can be used.

For example, it can be defined that the pixels at a distance of k pixels from a pixel under consideration are distance-k pixels. Pixels at a distance of k from the pixel under consideration can be considered as a concentric ring or frame of pixels around that pixel. In some embodiments, pixel content associated with a set of distance-k pixels can be defined as a spatial feature. In some embodiments, pixel content is associated with all pixels at distance-k. In some embodiments, pixel content is associated with only a subset of all pixels at distance-k. So, the immediate neighbors of the pixel under consideration are distance-1 pixels and the pixel content of the set of distance-1 pixels can be determined, for example, by using the formula for finding the Rutovitz crossing number. The pixel content at distance-2 pixels can be determined, for example, by using a modified version of the formula for finding the Rutovitz crossing number.

At 504, for the pixel, a second value representative of a pixel content present at a second set of pixels associated with a second distance from the pixel is determined. For example, for a pixel corresponding to a sample point of a character input under consideration, in addition to determining the pixel content of distance-2 pixels in 502, the pixels located at distance-3 from the pixel can be also determined in 504, for example, by using a modified version of the formula for finding the Rutovitz crossing number.

In some embodiments, process 500 further includes determining, for the pixel, one or more values representative of pixel content(s) present at set(s) or subsets of distance-k pixels, where k=4, 5, 6 . . . etc. In some embodiments, as a result of process 500, features are extracted from a range of concentric rings or frames (or portions thereof) of pixels around the pixel under consideration.

For example, a modified version of the formula for finding the Rutovitz crossing number ($RN_k$) for each set of all distance-k pixels ($RN_k$) can be used to determine the pixel content at a set of all distance-k pixels:

$$RN_k = \frac{1}{2}\sum_{i=1}^{8k} |p_i - p_{i+1}| \qquad (2)$$

In formula (2), $p_i$ is 1 when the corresponding pixel is filled in (shown as black in the figures) and $p_i$ is 0 when the corresponding pixel is blank (shown as white in the figures). $P_i$ through $p_{8k}$ represent each of the pixels within the set of distance-k pixels. Also, $p_1 = p_{8k+1}$.

At 506, the first and second values are used to compute one or more spatial features associated with the pixel under consideration for purposes of content recognition. In some embodiments, the values representative of pixel contents present at various distances from the pixel under consideration can be summed up to represent the aggregate pixel content present across those various distances from the pixel. In some embodiments, the aggregate pixel content present across various distances from the pixel is defined as a feature. In some embodiments, the first and second values are placed into a feature vector associated with the pixel under consideration. In some embodiments, the sum of the first and second values is placed into a feature vector associated with the pixel under consideration. Then, at least that feature vector is fed into one or more character recognition models to recognize the character that the character input was intended to be identified as.

Figure 6B:
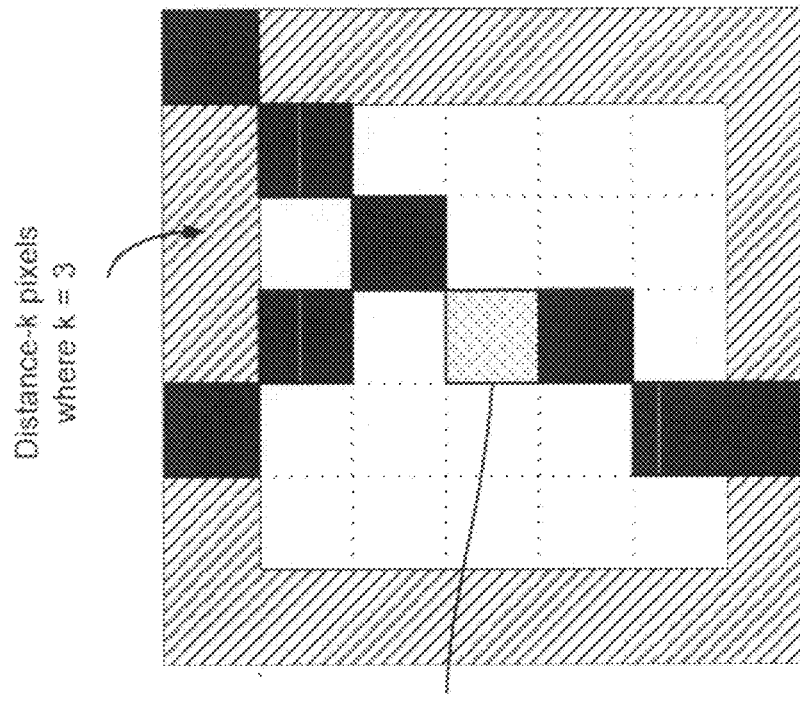
FIG. 6B shows an example of distance-3 pixels from a pixel under consideration.
Figure 6A:
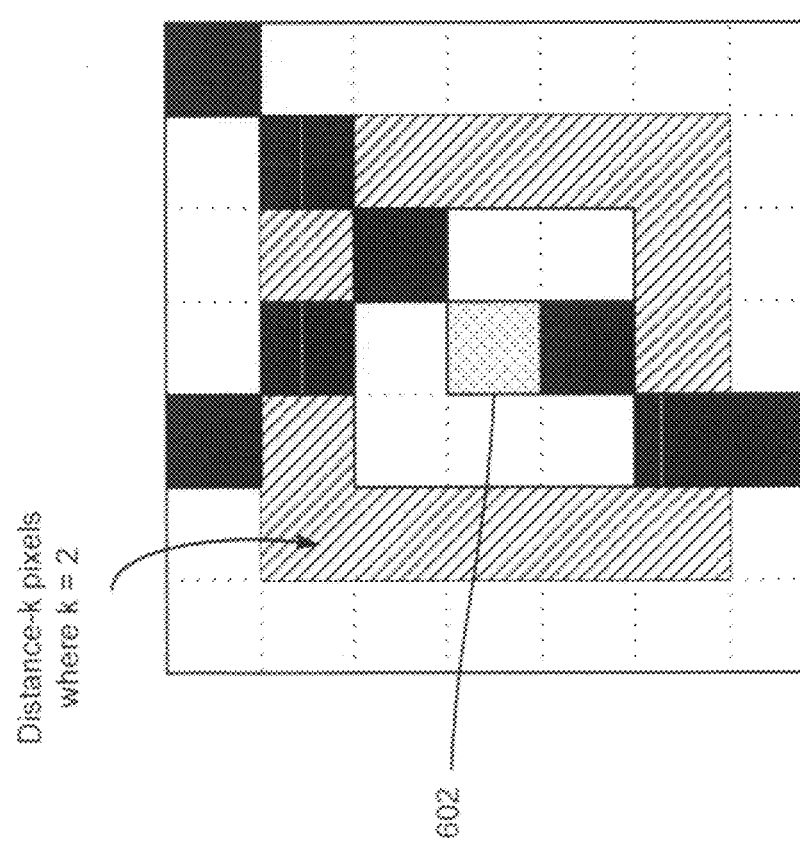
FIG. 6A shows an example of distance-2 pixels from a pixel under consideration.

FIGS. 6A and 6B are examples used to illustrate determining values representative of pixel contents present at distance-2 pixels and distance-3 pixels, respectively. In the examples of FIGS. 6A and 6B, pixel content at distance-k includes the set of all pixels located at distance-k from the pixel consideration.

FIG. 6A shows an example of distance-2 pixels from a pixel under consideration. In the example, the pixel under consideration is center pixel 602. The shaded-in ring of pixels around center pixel 602 represent the set of distance-2 pixels for center pixel 602. The number of filled-in pixels included among the set of distance-2 pixels represent the pixel content for the set of distance-2 pixels. Applying formula (2) to the example of FIG. 6A, the pixel content at the set of distance-2 pixels ($RN_2$) is 3.

FIG. 6B shows an example of distance-3 pixels from a pixel under consideration. The example of FIG. 6B is similar to that of FIG. 6A only that in FIG. 6B, k=3. In this example, the pixel under consideration is center pixel 602. The shaded-in ring of pixels around center pixel 602 represent the set of distance-3 pixels for center pixel 602. The number of filled-in pixels included among the set of distance-3 pixels represent the pixel content for the set of distance-3 pixels. Applying formula (2) to the example of FIG. 6B, the pixel content at the set of distance-3 pixels ($RN_3$) is 3.

Figure 6D:
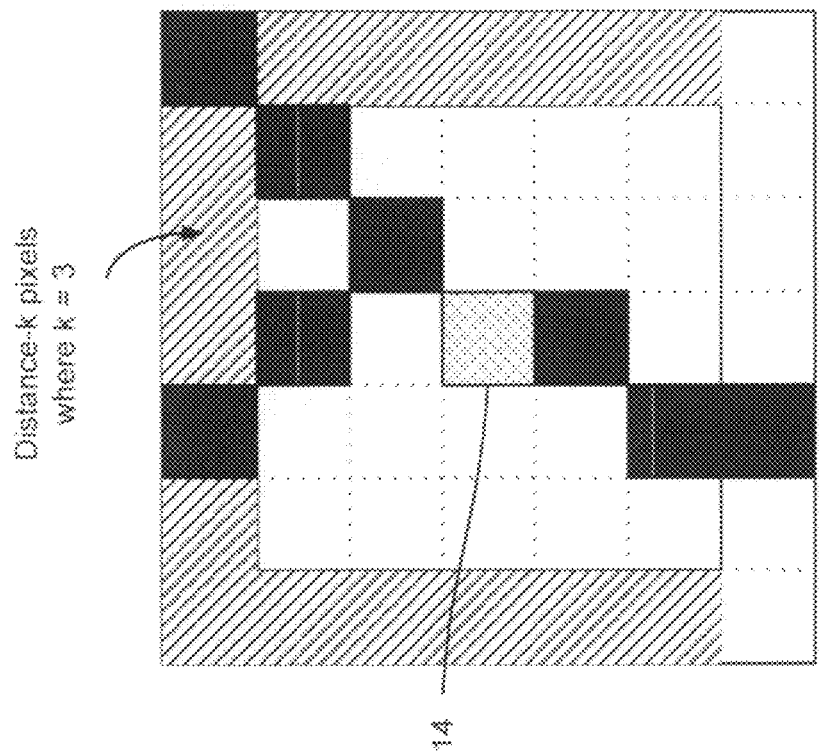
FIG. 6D shows another example of distance-3 pixels from a pixel under consideration.
Figure 6C:
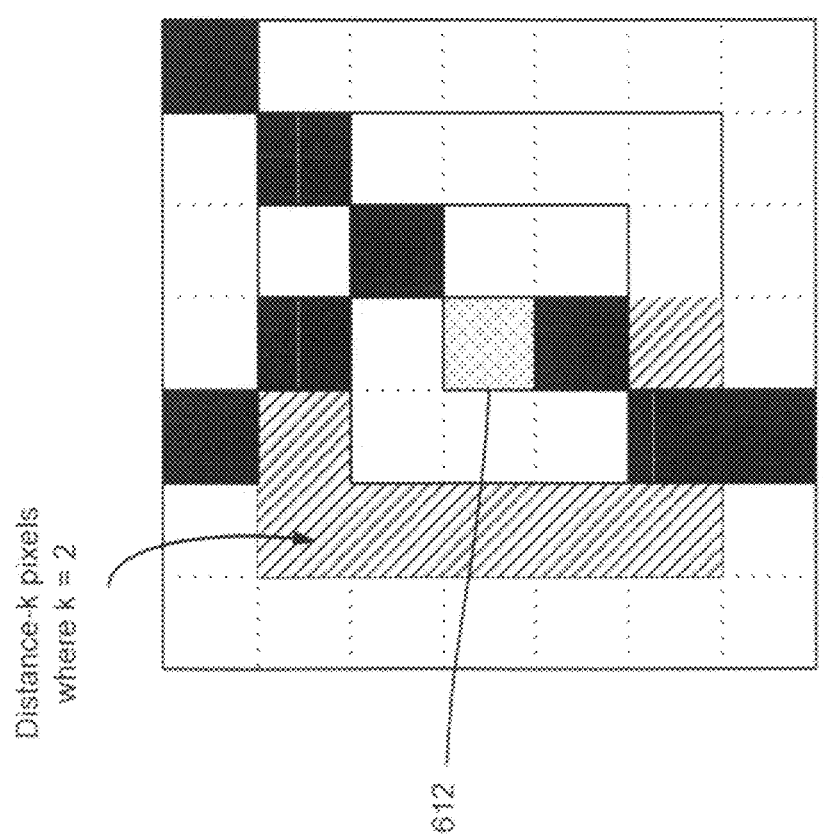
FIG. 6C shows another example of distance-2 pixels from a pixel under consideration.

FIGS. 6C and 6D are examples used to illustrate determining values representative of pixel contents present at distance-2 pixels and distance-3 pixels, respectively. In the examples of FIGS. 6C and 6D, pixel content at distance-k includes a subset of all pixels located at distance-k from the pixel consideration.

FIG. 6C shows another example of distance-2 pixels from a pixel under consideration. Note that in FIG. 6C, less than all the pixels at distance-2 are shaded in to represent that the pixel content associated with distance-2 comprises fewer than all the pixels located at distance-2 away from center pixel 612. In the example, the pixel under consideration is center pixel 612. The shaded-in pixels around center pixel 612 represent the set of distance-2 pixels for center pixel 612. The number of filled-in pixels included among the shaded in distance-2 pixels represent the pixel content for the subset of all distance-2 pixels. Based on the pattern of shaded in distance-2 pixels in this example, the pixel content at distance-2 is 2.

FIG. 6D shows another example of distance-3 pixels from a pixel under consideration. Note that in FIG. 6D, less than all the pixels at distance-3 are shaded in to represent that the pixel content associated with distance-3 comprises fewer than all the pixels located at distance-3 away from center pixel 614. In the example, the pixel under consideration is center pixel 614. The shaded-in pixels around center pixel 614 represent the set of distance-3 pixels for center pixel 614. The number of filled-in pixels included among the shaded in distance-3 pixels represent the pixel content for the subset of all distance-3 pixels. Based on the pattern of shaded in distance-3 pixels in this example, the pixel content at distance-3 is 2.

Figure 7A:
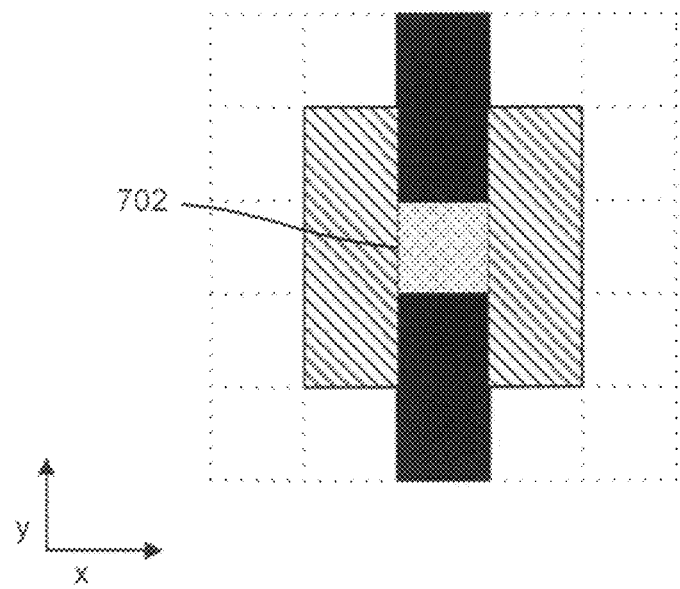
FIG. 7A shows an example of a pixel under consideration with neighboring filled in pixels that are arranged in a vertical line with that pixel.
Figure 7B:
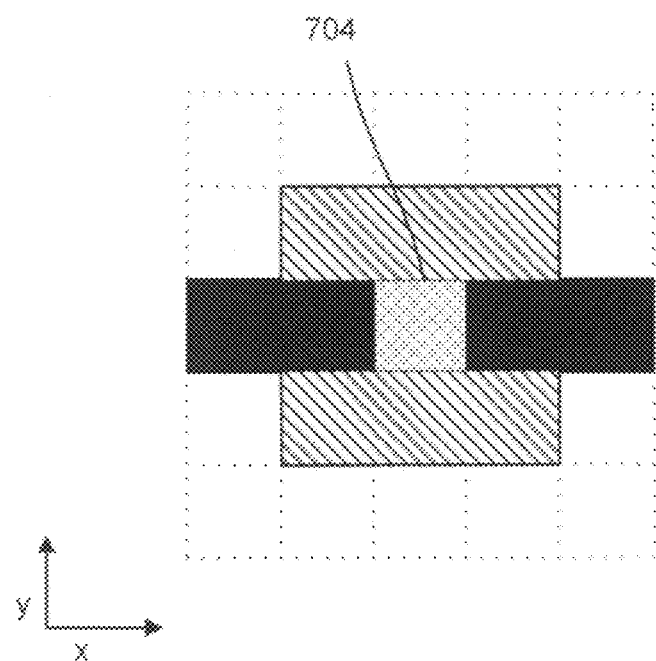
FIG. 7B shows an example of a pixel under consideration with neighboring filled in pixels that are arranged in a horizontal line with that pixel.

FIGS. 7A and 7B illustrate the conventional spatial feature of a Rutovitz crossing number with respect to two different arrangements of filled in pixels around a pixel under consideration.

FIG. 7A shows an example of a pixel under consideration with neighboring filled in pixels that are arranged in a vertical line with that pixel. In this example, the pixel under consideration is center pixel 702. The Rutovitz crossing number of center pixel 702 (i.e., the pixel content of the immediate eight neighbors of center pixel 702) can be determined by applying formula (1), as mentioned above. As such, the Rutovitz crossing number of center pixel 702 is 2.

FIG. 7B shows an example of a pixel under consideration with neighboring filled in pixels that are arranged in a horizontal line with that pixel. In this example, the pixel under consideration is center pixel 704. The Rutovitz crossing number of center pixel 704 (i.e., the pixel content of the immediate eight neighbors of center pixel 704) can be determined by applying formula (1), as mentioned above. As such, the Rutovitz crossing number of center pixel 704 is 2, which is the same as that of the pixel arrangement in the example of FIG. 7A.

As shown by FIGS. 7A and 7B, another limitation of the conventional Rutovitz crossing number spatial feature is that it does not indicate the locations of surrounding/neighborhood spatial information ("action") relative to the location of a pixel under consideration. While the filled in pixels surrounding center pixel 702 and center pixel 704 were oriented differently with respect to those pixels under consideration (e.g., the filled in pixels were above and below center pixel 702 and the filled in pixels were to the left and right of center pixel 704), the Rutovitz crossing number for the two pixels were the same (2). Sometimes, the relative location of spatial information or action as compared to the location of a pixel can be useful for disambiguating between characters. Therefore, it would be helpful to consider spatial information surrounding a pixel under consideration as associated with cardinal directions relative to the location of that pixel.

Figure 8:
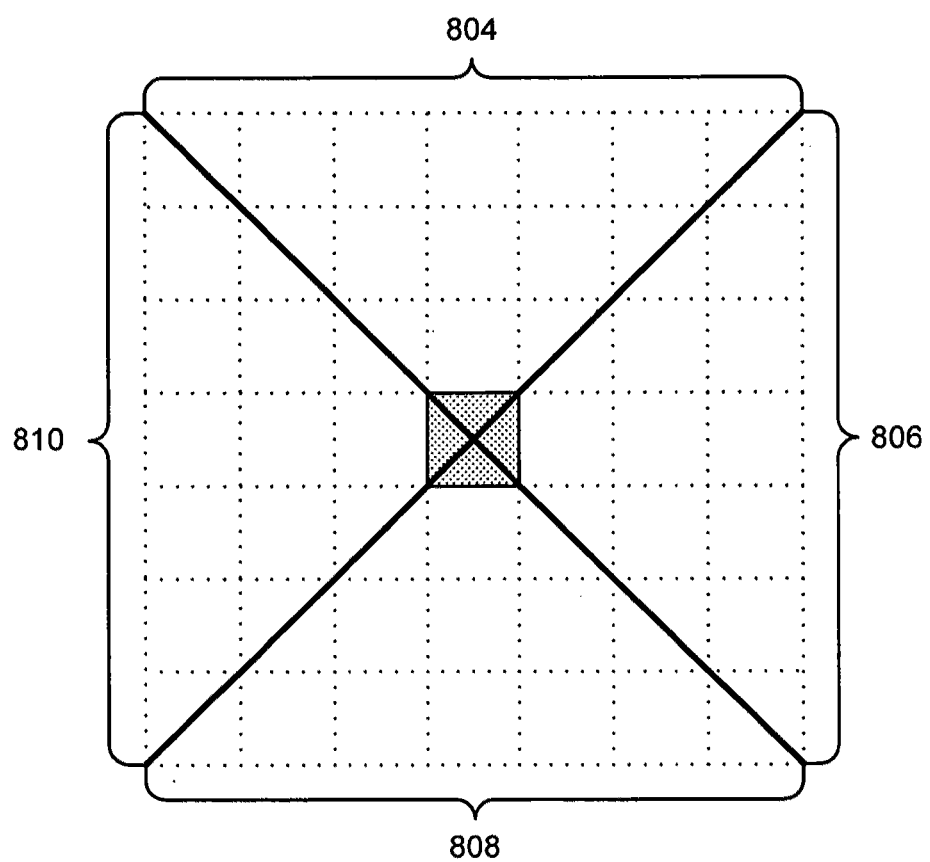
FIG. 8 is a diagram showing an embodiment of four cardinal directions relative to a pixel, from which features can be extracted.

FIG. 8 is a diagram showing an embodiment of four cardinal directions relative to a pixel, from which features can be extracted. 804 is associated with a set of pixels (which can include whole pixels and/or portions of pixel(s)) associated with the north direction relative to the shaded in, center pixel that is under consideration. 806 is associated with a set of pixels (which can include whole pixels and/or portions of pixel(s)) associated with the east direction relative to the shaded in, center pixel that is under consideration. 808 is associated with a set of pixels (which can include whole pixels and/or portions of pixel(s)) associated with the south direction relative to the shaded in, center pixel that is under consideration. 810 is associated with a set of pixels (which can include whole pixels and/or portions of pixel(s)) associated with the west direction relative to the shaded in, center pixel that is under consideration.

One benefit to determining sets of pixels in various directions of a pixel under consideration is the ability to, potentially, discriminate between action that appears within an area associated with one direction relative to the pixel from action that appears within another (at least partially) mutually exclusive area associated with another direction relative to that pixel. In some embodiments, such distinction between areas can help to recognize one or more handwritten strokes, which can lead to disambiguating among characters. Recognition of one or more strokes can be particularly useful in disambiguating between Chinese characters, where the difference in a single stroke could produce a different character.

Figure 9:
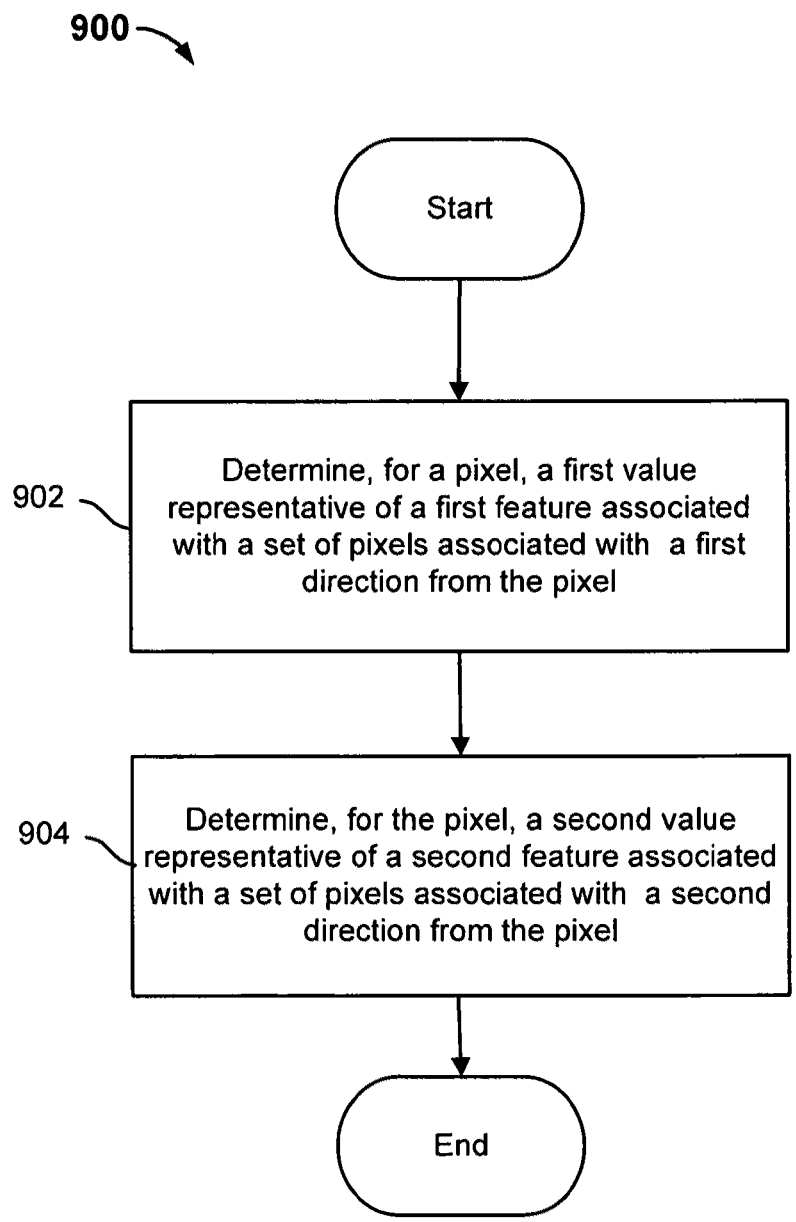
FIG. 9 is a flow diagram showing an embodiment of a process for extracting spatial information that is associated with a direction relative to a pixel.

FIG. 9 is a flow diagram showing an embodiment of a process for extracting spatial information that is associated with a direction relative to a pixel. In some embodiments, process 900 is implemented at least as part of 104 of process 100. In some embodiments, values determined by process 900 are included in a feature vector such as feature vector 302 of FIG. 3.

At 902, for a pixel, a first value representative of a first feature associated with a set of pixels associated with a first direction from the pixel is determined. For example, four cardinal directions (e.g., north, east, south, and west) can be defined for each pixel. Then, a set of pixels at one or more pixel distances in one of the cardinal directions, north for example, can be selected. In some embodiments, the set of pixels associated with a particular direction may comprise all pixels at one or more pixel distances in that direction of the current pixel under consideration. In some other embodiments, the set of pixels associated with a particular direction may comprise of only a subset of all pixels at one or more pixel distances in that direction. In some embodiments, the set of pixels associated with a particular direction may comprise contiguous pixels. A feature value (e.g., pixel content) associated with this set of pixels can be determined, in some embodiments, by using a modified version of the Rutovitz crossing number.

At 904, for the pixel, a second value representative of a second feature associated with a set of pixels associated with a second direction from the pixel is determined. For example, assuming that a set of pixels that were north of the pixel was selected in 902, then a set of pixels at one or more pixel distances that are in a second direction, east for example, of the pixel can be selected. A feature value associated with this set (or subset) of pixels can be determined, in some embodiments, by using a modified version of the Rutovitz crossing number. In some embodiments, the set of pixels in a first direction from the pixel and the set of pixels in a second direction from the pixel can include one or more of the same pixels.

In some embodiments, one or more values representative of other features associated with sets of pixels (e.g., at one or more pixel distances) associated with other directions from the pixel can be determined. For example, a set of pixels that are south or west of the pixel can be selected and a feature value can be calculated for that set of pixels.

FIGS. 10A, 10B, 10C, and 10D illustrate examples of spatial features to be extracted from four cardinal directions of a pixel under consideration.

In these examples, the pixel content of a set of contiguous pixels across consecutive pixel distances in a direction (e.g., north, east, south, or west) is calculated using a modified version of the Rutovitz crossing number. For a linear segment (e.g., linear series) of $N=2k+1$ pixels $p_i$ associated with a distance-k ring, the following (a modified version of $RN_k$) is computed to represent the pixel content at that linear segment:

$$CN_k = \frac{1}{2}\sum_{i=1}^{N-1}|p_i - p_{i+1}| \quad (3)$$

In formula (3), $p_i$ is 1 when the corresponding pixel is filled in (shown as black in the figures) and $p_i$ is 0 when the corresponding pixel is blank (shown as white in the figures). $P_i$ through $p_N$ represent each pixel in a linear segment of pixels (of length N) within the set of distance-k pixels.

In some embodiments, a spatial feature associated with a direction is computed using the following formula:

$$CN_{direction} = \frac{1}{K}\sum_{i=1}^{K} CN_k \quad (4)$$

In formula (4), the direction can be one of, in some embodiments, north, east, south, or west. k is associated with the distance-k pixels in the direction of direction and K is the largest pixel distance (e.g., K is the coarsest resolution) from the pixel under consideration. In some embodiments, the value of K is selected based on the size of the input area and/or bitmap. For example, for a 128-by-128 bitmap, the resolution range of $1 \leq k \leq K=13$ can be selected.

In FIG. 10A, 1002, 1004, and 1006 are all examples of linear segments with $N=2k+1$ contiguous pixels within a distance-k ring; 1002 is a linear segment of $N=3$ pixels within a distance-1 ring; 1004 is a linear segment of $N=5$ pixels within a distance-2 ring, and 1006 is a linear segment of $N=7$ pixels within a distance-3 ring. In this example, linear segments of pixels 1002, 1004, and 1006 are located at various distances (from distance-1 through distance-3) in the northern direction of the pixel under consideration, center pixel 1008. The pixel content can be calculated for each of 1002, 1004, and 1006 (e.g., using formula (3)). In some embodiments, the sum of the pixel contents associated with various distances in one direction (e.g., as calculated by formula (4)) comprises a spatial feature associated with that direction of a pixel. In this example, the sum of the pixel contents of 1002, 1004, and 1006 comprise the spatial feature in the northern direction of center pixel 1008.

While in this example, the pixel content associated with a particular direction of a center pixel includes contiguous pixels at consecutive pixel distances, in some embodiments, the pixel content associated with a particular direction of a center pixel may include pixel content at non-consecutive pixel distances (e.g., pixel content at distance-1 and distance-3 but not at distance-2) and/or may include pixel content of at least some non-contiguous pixels.

FIG. 10B illustrate linear segments within distance-k rings, where k=1, 2, and 3, in the eastern direction of center pixel 1008. FIG. 10C illustrate linear segments within distance—k rings, where k=1, 2, and 3, in the southern direction of center pixel 1008. FIG. 10D illustrate linear segments within distance-k rings, where k=1, 2, and 3, in the western direction of center pixel 1008. The spatial features in the respective directions (east, south, and west) for the examples of FIGS. 10B, 10C, and 10D can be calculated in the same manner as for the example of FIG. 10A.

FIGS. 11A, 11B, 11C, and 11D illustrate examples of spatial features to be extracted from four cardinal directions of a pixel under consideration. In this example, the pixel content (spatial feature) associated with a particular direction includes contiguous pixels at consecutive pixel distances. The pattern of filled in pixels within the neighborhood of the pixel under consideration, center pixel 1102, is the same for each of FIGS. 11A, 11B, 11C, and 11D. FIG. 11A shows a spatial feature for the northern direction; FIG. 11B shows a spatial feature for the eastern direction; FIG. 11C shows a spatial feature for the southern feature; and FIG. 11D shows a spatial feature for the western direction. However, the spatial feature in each direction (north, east, south, and west) of center pixel 1102 is not necessarily the same. Applying formulas (3) and (4) to the examples, the following spatial features associated with directions are as follows: $CN_{north}=5$, $CN_{east}=3$, $CN_{south}=3$, and $CN_{west}=0$. Using these determined spatial features, it can be observed that, within three consecutive pixel distances of k=1, 2, and 3, more action is located in the direction north of the pixel under consideration than in any other direction. Also, within these three pixel distances, the amount of action is equal in the direction east and south of the pixel. Lastly, no action is located west of the pixel within three pixel distances.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of recognizing content, comprising:
   a processor configured to:
   determine a first value representative of a pixel content present at a first set of pixels of a bitmap associated with a first distance from a pixel under consideration of the bitmap;
   determine a second value representative of a pixel content present at a second set of pixels of the bitmap associated with a second distance from the pixel under consideration; and
   use the first and second values to compute one or more spatial features associated with the pixel under consideration for purposes of content recognition; and
   a memory coupled to the processor and configured to provide the processor with instructions.

2. The system of claim 1, wherein the first value representative of the pixel content present at the first set of pixels associated with the first distance from the pixel under consideration comprises pixel content present at a subset of the first set of pixels.

3. The system of claim 1, wherein the second value representative of the pixel content present at the second set of pixels associated with the second distance from the pixel under consideration comprises pixel content present at a subset of the second set of pixels.

4. The system of claim 1, wherein the processor is further configured to determine, for the pixel, a third value representative of a pixel content present at a third set of pixels of the bitmap associated with a third distance from the pixel.

5. The system of claim 1, wherein the processor is further configured to aggregate the first value and the second value into an aggregate value representative of a pixel content present at the first set of pixels associated with the first distance and the second set of pixels associated with the second distance.

6. A method of recognizing content, comprising:
   determining a first value representative of a pixel content present at a first set of pixels of a bitmap associated with a first distance from a pixel under consideration of the bitmap;
   determining a second value representative of a pixel content present at a second set of pixels of the bitmap associated with a second distance from the pixel under consideration; and
   using the first and second values to compute one or more spatial features associated with the pixel under consideration for purposes of content recognition.

7. The method of claim 6, wherein the first value representative of the pixel content present at the first set of pixels associated with the first distance from the pixel under consideration comprises pixel content present at a subset of the first set of pixels.

8. The method of claim 6, wherein the second value representative of the pixel content present at the second set of pixels associated with the second distance from the pixel under consideration comprises pixel content present at a subset of the second set of pixels.

9. The method of claim 6, further aggregating the first value and the second value into an aggregate value representative of a pixel content present at the first set of pixels associated with the first distance and the second set of pixels associated with the second distance.

10. A non-transitory computer program product for recognizing content, the computer program product being embodied in a computer readable medium and comprising computer instructions for:
    determining a first value representative of a pixel content present at a first set of pixels of a bitmap associated with a first distance from a pixel under consideration of the bitmap;
    determining a second value representative of a pixel content present at a second set of pixels of the bitmap associated with a second distance from the pixel under consideration; and
    using the first and second values to compute one or more spatial features associated with the pixel under consideration for purposes of content recognition.

11. A system of recognizing content, comprising:
    a processor configured to:
    determine, for a pixel of a bitmap, a first value representative of a first feature associated with a set of pixels of the bitmap associated with a first direction from the pixel in the bitmap; and
    determine, for the pixel, a second value representative of a second feature associated with a set of pixels of the bitmap associated with a second direction from the pixel in the bitmap; and
    a memory coupled to the processor and configured to provide the processor with instructions.

12. The system of claim 11, wherein determining, for the pixel, the first value representative of the first feature associated with the set of pixels associated with the first direction from the pixel comprises:
    determining a first value representative of a pixel content present at a subset of pixels of the bitmap associated with a first distance from the pixel;
    determining a second value representative of a pixel content present at a subset of pixels of the bitmap associated with a second distance from the pixel; and
    aggregating the first value and the second value into an aggregate value representative of a pixel content present at the subset of pixels associated with the first distance from the pixel and the subset of pixels associated with the second distance from the pixel.

13. The system of claim 12, wherein the first and second distance comprises non-consecutive distances.

14. The system of claim 11, wherein the first direction is one of the following: north, east, south, or west.

15. The system of claim 14, wherein the second direction is one of north, east, south, or west and different from a direction associated with the first direction.

16. The system of claim 11, wherein the set of pixels associated with the first direction from the pixel comprises a set of contiguous pixels of the bitmap associated with the first direction.

17. The system of claim 11, wherein the set of pixels associated with the second direction from the pixel comprises a set of contiguous pixels of the bitmap associated with the second direction.

18. The system of claim 11, wherein the set of pixels associated with the first direction from the pixel comprises a subset of the set of pixels at one or more distances associated with the first direction.

19. The system of claim 11, wherein the set of pixels associated with the second direction from the pixel comprises a subset of the set of pixels at one or more distances associated with the second direction.

20. A method of recognizing content, comprising:
   determining, for a pixel of a bitmap, a first value representative of a first feature associated with a set of pixels of the bitmap associated with a first direction from the pixel in the bitmap; and
   determining, for the pixel, a second value representative of a second feature associated with a set of pixels of the bitmap associated with a second direction from the pixel in the bitmap.

21. The method of claim 20, wherein determining, for the pixel, the first value representative of the first feature associated with the set of pixels associated with the first direction from the pixel comprises:
   determining a first value representative of a pixel content present at a subset of pixels of the bitmap associated with a first distance from the pixel;
   determining a second value representative of a pixel content present at a subset of pixels of the bitmap associated with a second distance from the pixel; and
   aggregating the first value and the second value into an aggregate value representative of a pixel content present at the subset of pixels associated with the first distance from the pixel and the subset of pixels associated with the second distance from the pixel.

22. The method of claim 21, wherein the first and second distance comprises non-consecutive distances.

23. The method of claim 21, wherein the first direction is one of the following: north, east, south, or west.

24. The method of claim 23, wherein the second direction is one of north, east, south, or west and different from a direction associated with the first direction.

25. The method of claim 20, wherein the set of pixels associated with the first direction from the pixel comprises a subset of the set of pixels at one or more distances associated with the first direction.

26. The method of claim 20, wherein the set of pixels associated with the second direction from the pixel comprises a subset of the set of pixels at one or more distances associated with the second direction.

27. A computer program product for recognizing content, the computer program product being embodied in a computer readable medium and comprising computer instructions for:
   determining, for a pixel of a bitmap, a first value representative of a first feature associated with a set of pixels of the bitmap associated with a first direction from the pixel in the bitmap; and
   determining, for the pixel, a second value representative of a second feature associated with a set of pixels of the bitmap associated with a second direction from the pixel in the bitmap.

* * * * *